(12) United States Patent
Wang et al.

(10) Patent No.: US 11,818,655 B2
(45) Date of Patent: Nov. 14, 2023

(54) CONNECTION MANAGEMENT FOR INTERNET OF THINGS DEVICES

(71) Applicant: Verizon Patent and Licensing Inc., Basking Ridge, NJ (US)

(72) Inventors: Carl Wang, Syosset, NY (US); Quentin N. Robinson, Willingboro, NJ (US); Ted Stecko, Natick, MA (US); Shamik Basu, Lake Hiawatha, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/674,110

(22) Filed: Feb. 17, 2022

(65) Prior Publication Data
US 2022/0174596 A1 Jun. 2, 2022

Related U.S. Application Data

(63) Continuation of application No. 16/547,945, filed on Aug. 22, 2019, now Pat. No. 11,272,446, which is a continuation of application No. 15/632,715, filed on Jun. 26, 2017, now Pat. No. 10,433,248.

(51) Int. Cl.
*H04W 4/00* (2018.01)
*H04W 52/02* (2009.01)
*H04L 67/12* (2022.01)

(52) U.S. Cl.
CPC ......... *H04W 52/0216* (2013.01); *H04L 67/12* (2013.01); *H04W 52/0254* (2013.01)

(58) Field of Classification Search
None
See application file for complete search history.

(56) References Cited

U.S. PATENT DOCUMENTS

| | | | |
|---|---|---|---|
| 2014/0266678 A1* | 9/2014 | Shapiro | G05B 23/0272 340/514 |
| 2015/0253747 A1 | 9/2015 | Chun et al. | |
| 2016/0073395 A1 | 3/2016 | Iberg et al. | |
| 2017/0034791 A1* | 2/2017 | Tohzaka | H04W 4/70 |
| 2017/0187588 A1 | 6/2017 | Nolan et al. | |
| 2017/0230461 A1 | 8/2017 | Verma et al. | |
| 2018/0097710 A1 | 4/2018 | Nochta | |
| 2018/0183938 A1 | 6/2018 | Cai et al. | |
| 2018/0234878 A1* | 8/2018 | Anand | H04W 28/0289 |
| 2018/0255152 A1 | 9/2018 | Jeuk et al. | |
| 2018/0287869 A1 | 10/2018 | Munafo et al. | |

* cited by examiner

Primary Examiner — Zewdu A Beyen

(57) ABSTRACT

A network device identifies Internet of Things (IoT) devices in a wireless network in a service area; determines a reporting configuration for each of the IoT devices associated with an initiation of reporting instances via the wireless; identifies, based on the reporting configurations, a potential signal loading reduction over the wireless network and/or a potential power consumption reduction related to the reporting configuration associated with at least one of the IoT devices; and modifies the reporting configuration of the at least one IoT device to enable the potential signal loading reduction and/or the potential power consumption reduction.

20 Claims, 8 Drawing Sheets

CONNECTION MANAGEMENT FOR INTERNET OF THINGS DEVICES

RELATED APPLICATIONS

The present application is a continuation of U.S. application Ser. No. 16/547,945 filed Aug. 22, 2019, entitled CONNECTION MANAGEMENT FOR INTERNET OF THINGS DEVICES, which is a continuation of U.S. application Ser. No. 15/632,715, filed Jun. 26, 2017, entitled CONNECTION MANAGEMENT FOR INTERNET OF THINGS DEVICES (now U.S. Pat. No. 10,433,248), the contents of both are incorporated by reference herein in their entireties.

BACKGROUND

Internet of Things ("IoT") technology refers to a wide range of physical objects or devices (i.e., "things") which—unlike general computing devices (e.g., desktop or laptop computers)—are specially designed to perform a specific function (e.g., collecting sensor data). And unlike the proliferation of mobile communication devices—which is capped by the number of potential users—the maximum number/usage of IoT devices is a function of the number of "things" in existence, making growth in IoT usage virtually limitless. Some of the early applications for IoT devices involve the cold chain monitoring market (e.g., food and pharma industries, etc.), automated meter-reading (e.g., public utilities, etc.), and asset tracking and inventory management systems (e.g., shipping, warehousing, etc.). Thus, going forward, innovative IoT-based commercial and consumer services will only continue to increase and expand.

DETAILED DESCRIPTION OF THE PREFERRED EMBODIMENTS

Figure 1:
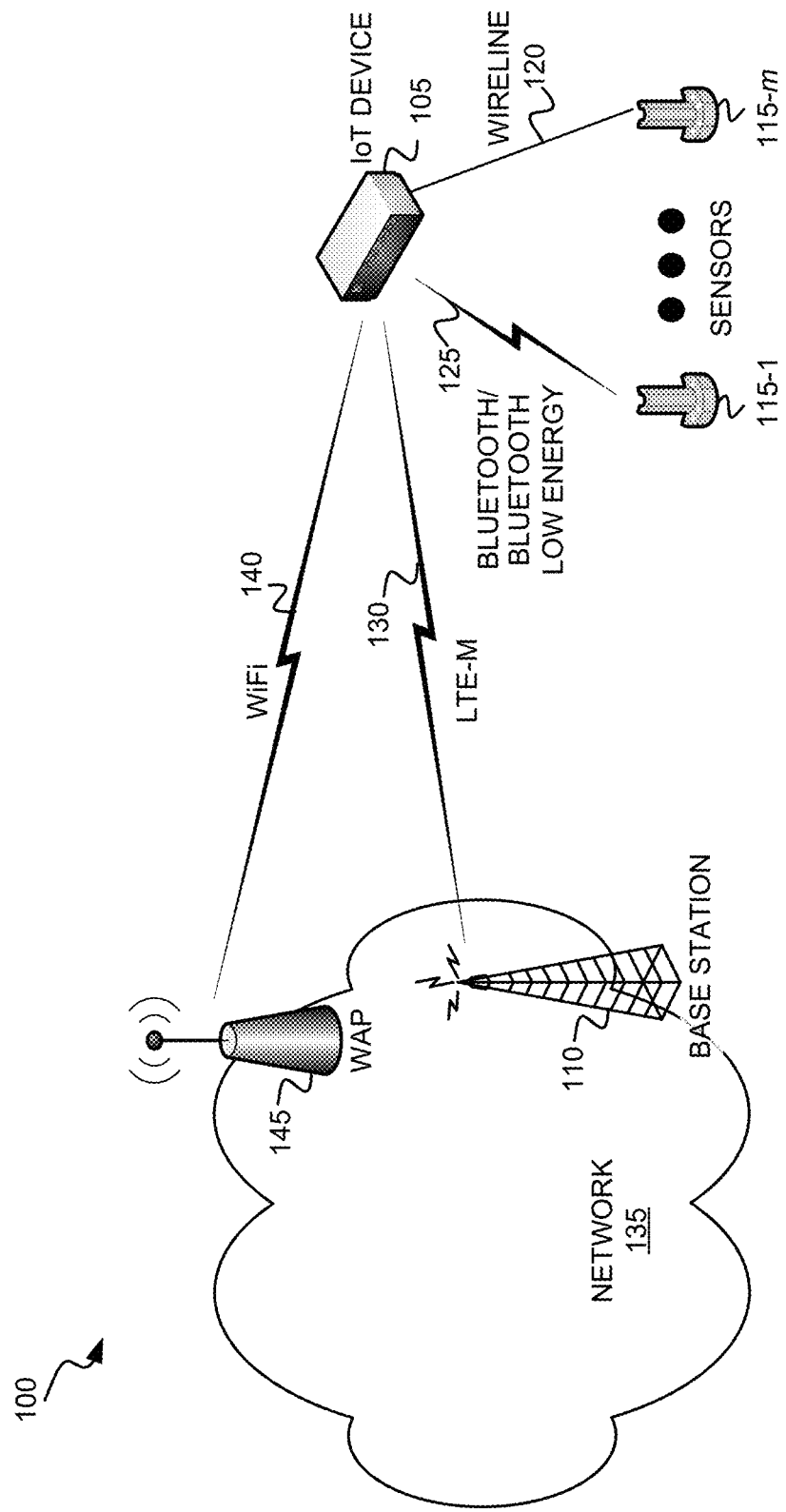
FIG. 1 is a diagram that illustrates an exemplary network architecture in which an IoT device may access a network for communicating reporting data.

The following detailed description refers to the accompanying drawings. The same reference numbers in different drawings may identify the same or similar elements. In addition, the detailed description does not limit the invention.

Because IoT devices are typically battery powered, IoT-related service providers and technology developers have a particular interest in techniques to reduce power consumption associated with higher-energy processing states (e.g., messaging) of in-field IoT devices, thereby extending operational battery life. In addition, because IoT devices may wirelessly connect to the Internet using already deployed network infrastructure—with its limited resources for simultaneous data upload—IoT-related service providers and technology developers also have a particular interest in techniques to reduce the number of network access requests generated per connected IoT device in an a particular service area (e.g., a single cell), thereby avoiding network overloading. According to exemplary embodiments described herein, the reporting schedules of registered IoT devices in a designated network service area are optimized according to reporting rules that are determined based on the reporting configurations of "neighboring" IoT devices. The optimized reporting schedules are specifically designed to reduce an overall number of network access requests and/or achieve power savings over alternative reporting schedules, without compromising reporting requirements applicable to the individual IoT devices.

IoT devices or user equipment (UE) are embedded with electronics (e.g., chipsets) for wired and/or wireless network connectivity (e.g., short-range and/or long-range) that enables IoT devices to collect, store, and exchange data. Short-range network connectivity includes, for example, Bluetooth™ and/or Bluetooth™ Low Energy (BLE) connectivity. Long-range network connectivity includes, for example, Wi-Fi and/or cellular network connectivity.

According to exemplary embodiments, an IoT device has computational and communicative capability, with various installed software (e.g., applications), and also includes or is configured to connect to one or more of various types of sensors, for example, via wired and/or Bluetooth™ and/or BLE. An IoT device uses the network connectivity to communicate with other IoT devices and/or with particular nodes (e.g., a server or computer) across the Internet.

According to exemplary embodiments, an IoT device connects to, and is managed by, network management devices in a network. For example, the network management devices may include a server and may operate in a cloud network. Because IoT device has limited processing power, memory and/or storage capacity, installation of client or agent software on the IoT device is at a premium. Software for configuring IoT device functionality (e.g., reporting schedules) supports one or more of the dominant architectures that prescribe how the IoT device connects to network management devices via the network. In one type of architecture, the IoT device has a built-in modem and can directly connect to a mobile network. In another type of architecture, the IoT device indirectly connects to a fixed network via a gateway that aggregates multiple IoT devices.

IoT devices may connect to remote servers at defined times for reporting data. Command and control signals from the remote servers may include reporting configurations for particular IoT devices, for example, based on a current location of an IoT device. Exemplary embodiments described herein provide reporting rules defining IoT device access to a wireless network responsive to detecting reporting "overlap" and/or "redundancy" among the different IoT devices deployed in the network. The network connectivity management for IoT UE described herein is network agnostic in that it manages the network including the IoT devices in both a fixed and mobile network context.

Network connectivity management for IoT devices described herein additionally provides reporting configuration management for IoT devices directly connected to various wireless networks, such as, for example, a low power, long range (LPWAN) radio access network (RAN), Third Generation (3G) RAN, a Fourth Generation (4G) RAN, a Fifth Generation (5G) RAN, category M1 ("Cat-M1") or Long Term Evolution (LTE) ("LTE-M") network, or other suitable network. According to one or more embodiments, IoT devices include software for LTE-M network-enabled, low power wireless connectivity, such that the IoT device is configured to be "controlled" and/or "managed" remotely across existing network (e.g., LTE) infrastructure. LTE-M-enabled IoT devices are capable of invoking power saving functions by entering power saving mode (PSM) and/or extended discontinuous reception (eDRX).

In PSM, the LTE-M-enabled IoT device remains registered with the network with no need to re-attach or re-establish a packet data network (PDN) connection. While in the PSM, the LTE-M-enabled IoT device, however, is not immediately reachable for mobile terminating services. More specifically, the LTE-M-enabled IoT device using PSM is available for mobile terminating services during a time that the IoT device is in connected mode, and for a period of an "active time" after the connected mode. The connected mode is caused by a prescheduled wake-up and/or an IoT device-originated event such as data transfer or signaling (e.g., in accordance with a periodic tracking area update (TAU) procedure). Thus, PSM may be used for an IoT device that uses originating and terminating services infrequently, and these services are delay tolerant (i.e., can accept a corresponding latency in the mobile terminating communication).

eDRX may be negotiated between the LTE-M-enabled IoT device and the network to reduce power consumption by the IoT device, while remaining available for mobile terminating data and/or network-originated procedures, within a certain delay that is dependent on the eDRX cycle value. eDRX allows IoT UE to "sleep" for up to 10.24 s between paging cycles. eDRX allows LTE-M-enabled IoT UE to inform the network how many "hyper frames" of 10.24 s, up to a maximum number configurable by the network operator, it intends to sleep before checking back in (e.g., at least 40 min.).

FIG. 1 illustrates two exemplary network connectivity architectures in which an IoT device 105 may be configured to wirelessly access a wireless network 135 for communicating with the connection management service, as described herein. IoT device 105 may connect directly (i.e., without any intervening gateway) with network 135, for example, to communicate with cloud-based hosts (not shown).

IoT device 105 may include a device that has computational and communicative capabilities. According to an exemplary embodiment, IoT 105 includes a modem that operates according to the LTE-M standard. According to other embodiments, the modem may operate according to another long-range wireless standard (e.g., LTE Narrow-Band-IoT (NB-IoT), a 5G standard, etc.), or a proprietary specification.

According to an exemplary embodiment, IoT device 105 includes and/or connects via a wired (e.g., wireline 120) and/or a short-range wireless communication interface (e.g., a Bluetooth™/Bluetooth Low Energy (BLE) 125) to a sensor(s) 115-1 to 115-$m$ (also referred to collectively as sensors 115, and individually or generally as sensor 115). Sensor 115 may collect various types of information (e.g., temperature, longitude, latitude, altitude, images, etc.). IoT device 105 may include a low power wireless microcontroller (MCU) and a long-range wireless communication interface, enabling LTE-M 130 connectivity to a wireless station or base station 110 and/or WiFi 140 connectivity to a wireless access point (WAP) 145, in network 135. In one embodiment, base station 110 includes an evolved Node B (eNB) that operates according to one or more versions of the LTE communication standard.

Network 135 may include one or more networks of various types including, for example, a public land mobile network (PLMN) (e.g., a code division multiple access (CDMA) 2000 PLMN, a global system for mobile communications (GSM) PLMN, an LTE PLMN and/or other types of PLMNs), a satellite mobile network, a telecommunications network (e.g., public switched telephone networks (PSTNs)), a wired and/or wireless local area network (LAN), a wired and/or wireless wide area network (WAN), a metropolitan area network (MAN), an intranet, the Internet, or a cable network (e.g., an optical cable network). In one implementation, network 135 may include a PLMN or satellite mobile network connected to the Internet. In another implementation, network 135 may include a fixed network (e.g., an optical cable network) connected to the Internet.

Figure 2:
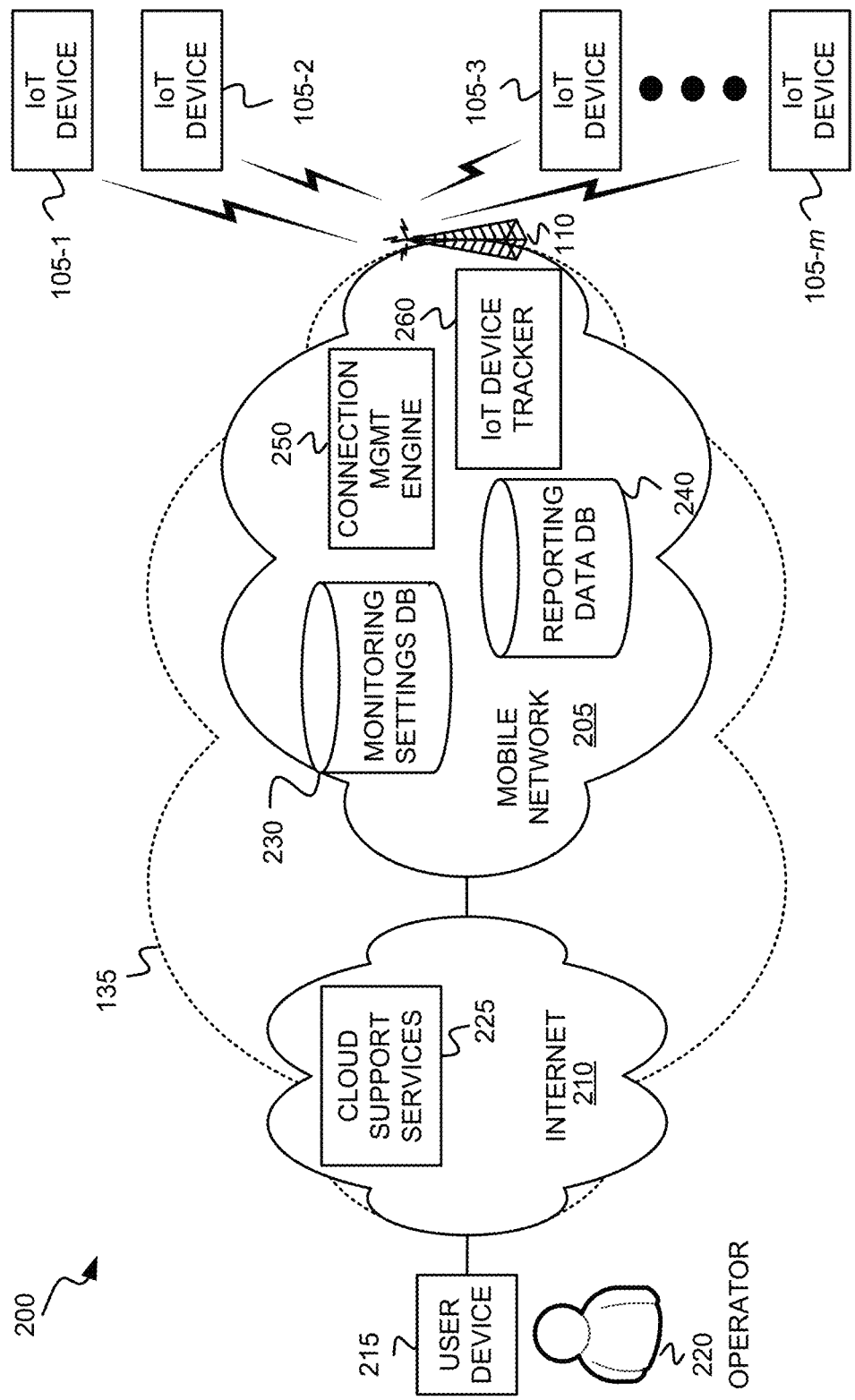
FIG. 2 is a diagram that illustrates exemplary network devices of a network which provide a connection management service as described herein.

FIG. 2 illustrates an exemplary network environment 200 in which connectivity management is provided that controls network access for IoT devices. Network environment 200 may include IoT devices 105-1 through 105-$m$ (also referred to collectively as IoT devices 105, and individually and generally as IoT device 105, base station 110, a user device 215 associated with an administrator or operator 220, and network 135. As further shown, network 135 includes a virtual/mobile network 205, Internet 210, a cloud support services 225, an IoT device monitoring settings DB 230, an IoT device reporting data DB 240, an IoT connection management ("mgmt") engine 250, and an IoT device tracking entity 260.

As shown, base station 110 acts as a wireless access point for IoT device 105 such that IoT device 105 wirelessly connects (e.g., via LTE-M) to base station 110 which, in turn, may forward one or more communications via wired or wireless links to other nodes in mobile network 205. The International Mobile Equipment Identity (IMEI) of IoT device 105 becomes available when IoT device 105 attaches via base station 110. Base station 110 directs packet data units transmitted from IoT device 105 to a destination node (e.g., reporting data DB 240) in mobile network 205, and directs packets, received from an originating and/or intermediary node (e.g., connection management node 250) in mobile network 205 toward the destination IoT device 105.

IoT devices 105 each include a device that may be designed for a specific function and which may be embedded with electronics, memory storage, and network connectivity that enables IoT devices 105 to collect, store and exchange data with other IoT devices or with certain network nodes. Each IoT device 105's network connectivity may include, for example, Bluetooth™ connectivity, Wi-Fi connectivity, and/or cellular network connectivity. According to an exemplary embodiment, IoT device 105 includes a battery and is powered by the battery.

User device 215 may include a computation and communication device, such as a wireless mobile communication device that is capable of communicating with network 135, which enables operator 220 to exchange data and/or to receive commands. For example, user device(s) 215 may include a cellular telephone; a personal communications system (PCS) terminal (e.g., that may combine a cellular telephone with data processing and data communications capabilities); a personal digital assistant (PDA); a smart phone; a laptop computer; a tablet computer; or another type of mobile computation and communication device. User device(s) 215 may communicate via Internet 210 with monitoring settings DB 230 to configure and/or update monitoring and/or reporting requirements associated with IoT device 105 by various processes described herein. User device(s) 215 may communicate via Internet 210 to query reporting data DB 240 for sensor information reported by IoT device 105 by various processes described herein.

Cloud support services 225 includes one or more network devices that stores geographical location information. For example, the geographical location information may include Cartesian coordinates, physical addresses, global positioning system (GPS) data, and/or map information, etc., that may be provided to IoT connection management engine 250, for example, and used to identify a location of IoT device 105 (e.g., convert Cartesian coordinates, GPS information, etc. to a physical address).

IoT device monitoring settings DB 230 includes one or more network devices that store monitoring requirements and/or reporting schedules for each IoT device 105 according to the network connection or access management service described herein. An IoT device 105 that has "registered" includes a device whose owner, administrator and/or operator 220 has subscribed to the network connection management service. A lookup may be performed in IoT device monitoring settings DB 230 using an IP address and/or IMEI or other types of device identifiers associated with the IoT device 105, and if the IP address or other type of device identifier is found during the lookup, the IoT device 105 is considered to have "registered," and the network access management service described herein is applied to communications from IoT device 105. In one embodiment, IoT device monitoring settings DB 230 may comprise multiple databases, for example, one for stationary IoT devices and one for mobile IoT devices.

IoT device reporting data DB 240 includes one or more network devices that store historical reporting data (e.g., sensor information, keep-alive signals, etc.) that are associated with a particular IoT device 105. IoT device reporting data DB 240 may be indexed with an identifier of the IoT device 105, or with an IP address assigned to user device 215, and used as a basis to retrieve one or more types of data stored in IoT device reporting data DB 240. For example, in response to user device 215 sending a query that includes a particular name associated with IoT device 105, IoT connection management engine 250 may identify an IoT device identifier (ID) from the query, and perform a lookup in IoT device reporting data DB 240 using the device ID to retrieve reporting data associated with the IoT device 105.

IoT connection management engine 250 includes functionality implemented in one or more network devices that include one or more processors configured to execute software functionality to perform processes described herein for implementing a network access management service that optimizes access for IoT devices 105 to network 135.

IoT Device tracking entity 260 may include functionality implemented in one or more network devices that include one or more processors configured to execute software functionality to perform processes described herein for implementing a network access management service configured to track the base stations that are currently associated with active registered IoT devices 105 based on registered device identifiers associated with IoT devices 105. The association may be determined by queries to a base station or a network maintenance service server, e.g., Over-the-Air Device Management Light Weight Mobile to Mobile (OTADM_LWM2M) server.

The configuration of the components of network environment 200 depicted in FIG. 2 is for illustrative purposes only, and other configurations may be implemented. Therefore, network environment 200 may include additional, fewer and/or different components, that may be configured differently, than depicted in FIG. 2.

Figure 3:
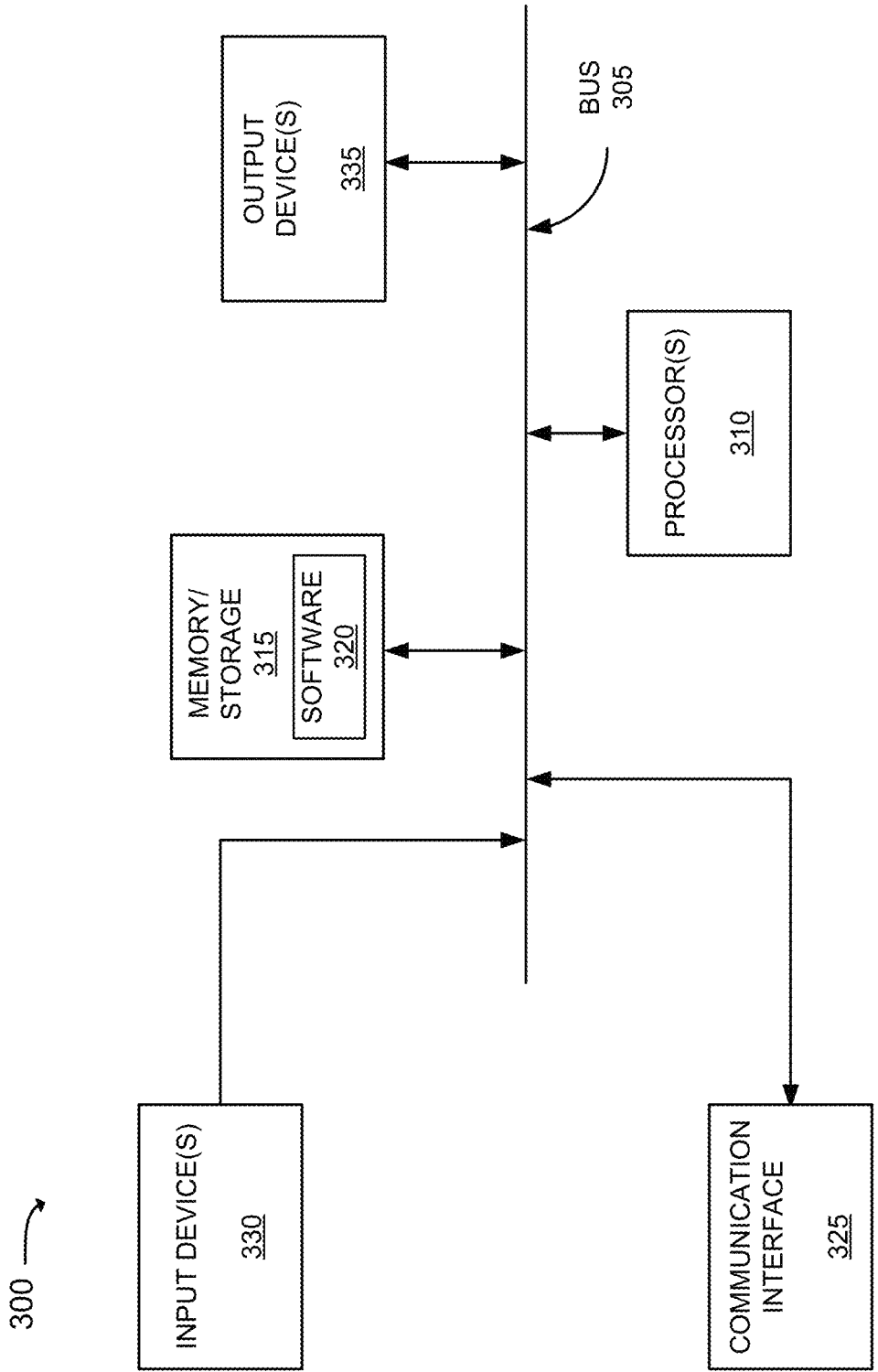
FIG. 3 is a diagram that illustrates exemplary components of a computational device that may correspond to one or more of the devices described herein.

FIG. 3 is a diagram illustrating exemplary components of a device 300 that may correspond to one or more of the devices described herein. For example, device 300 may correspond to components included in IoT device 105, base station 110, sensor 115, user device 215, IoT device monitoring settings DB 230, IoT device reporting data DB 240, IoT device IoT connection management engine 250, IoT device tracking entity 260, and other network elements/devices illustrated and described herein. As illustrated in FIG. 3, device 300 includes a bus 305, a processor 310, a memory/storage 315 that stores software 320, a communication interface 325, an input 430, and an output 335. According to other embodiments, device 300 may include fewer components, additional components, different components, and/or a different arrangement of components than those illustrated in FIG. 3 and described herein.

Bus 305 includes a path that permits communication among the components of device 300. For example, bus 305 may include a system bus, an address bus, a data bus, and/or a control bus. Bus 305 may also include bus drivers, bus arbiters, bus interfaces, clocks, and so forth.

Processor 310 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 310 may be implemented as hardware (e.g., a microprocessor, etc.), a combination of hardware and software (e.g., a SoC, an ASIC, etc.), may include one or multiple memories (e.g., cache, etc.), etc.

Processor 310 may control the overall operation or a portion of operation(s) performed by device 300. Processor 310 may perform one or multiple operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation and/or a process based on various techniques including, for example, multithreading, parallel processing, pipelining, interleaving, etc.

Memory/storage 315 includes one or multiple memories and/or one or multiple other types of storage mediums. For example, memory/storage 315 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 315 may include a hard disk (e.g., a magnetic disk, an optical disk, a magneto-optic disk, a solid state disk, etc.) and a corresponding drive. Memory/ storage 315 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 315 may include drives for reading from and writing to the storage medium.

Memory/storage 315 may be external to and/or removable from device 300, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 315 may store data, software, and/or instructions related to the operation of device 300.

Software 320 includes an application or a program that provides a function and/or a process. As an example, with reference to IoT connection management engine 250, software 320 may include an application that, when executed by processor 310, provides the functions of network connectivity management, as described herein. Similarly, IoT device 105 may include an application that, when executed by processor 310, provides the functions of network connectivity management, as described herein. Further, IoT device monitoring settings DB 230 may include an application that, when executed by processor 310, provides the functions of network connectivity management, as described herein. Also, IoT device reporting data DB 240 may include an application that, when executed by processor 310, provides the functions of IoT device monitoring settings DB 230, as described herein. For example, IoT device 105 may dynamically adapt its reporting of sensor information to IoT connection management engine 250 based on the dynamic reporting schedule reconfiguration procedure. Software 320 may also include firmware, middleware, microcode, hardware description language (HDL), and/or other form of instruction. Software 320 may further include an operating system.

Communication interface 325 permits device 300 to communicate with other devices, networks, systems, and/or the like. Communication interface 325 includes one or multiple wireless interfaces and/or wired interfaces. For example, communication interface 325 may include one or multiple transmitters and receivers, or transceivers. Communication interface 325 may operate according to a protocol stack and a communication standard. Communication interface 325 may include an antenna. Communication interface 325 may include various processing logic or circuitry (e.g., multiplexing/de-multiplexing, filtering, amplifying, converting, error correction, etc.).

Input 330 permits an input into device 300. For example, input 330 may include a keyboard, a mouse, a display, a touchscreen, a touchless screen, a button, a switch, an input port, speech recognition logic, and/or some other type of visual, auditory, tactile, etc., input component. Output 335 permits an output from device 300. For example, output 335 may include a speaker, a display, a touchscreen, a touchless screen, a light, an output port, and/or some other type of visual, auditory, tactile, etc., output component.

Device 300 may perform a process and/or a function, as described herein, in response to processor 310 executing software 320 stored by memory/storage 315. By way of example, instructions may be read into memory/storage 315 from another memory/storage 315 (not shown) or read from another device (not shown) via communication interface 325. The instructions stored by memory/storage 315 cause processor 310 to perform a process described herein. Alternatively, for example, according to other implementations, device 300 performs a process described herein based on the execution of hardware (processor 310, etc.).

Figure 4:
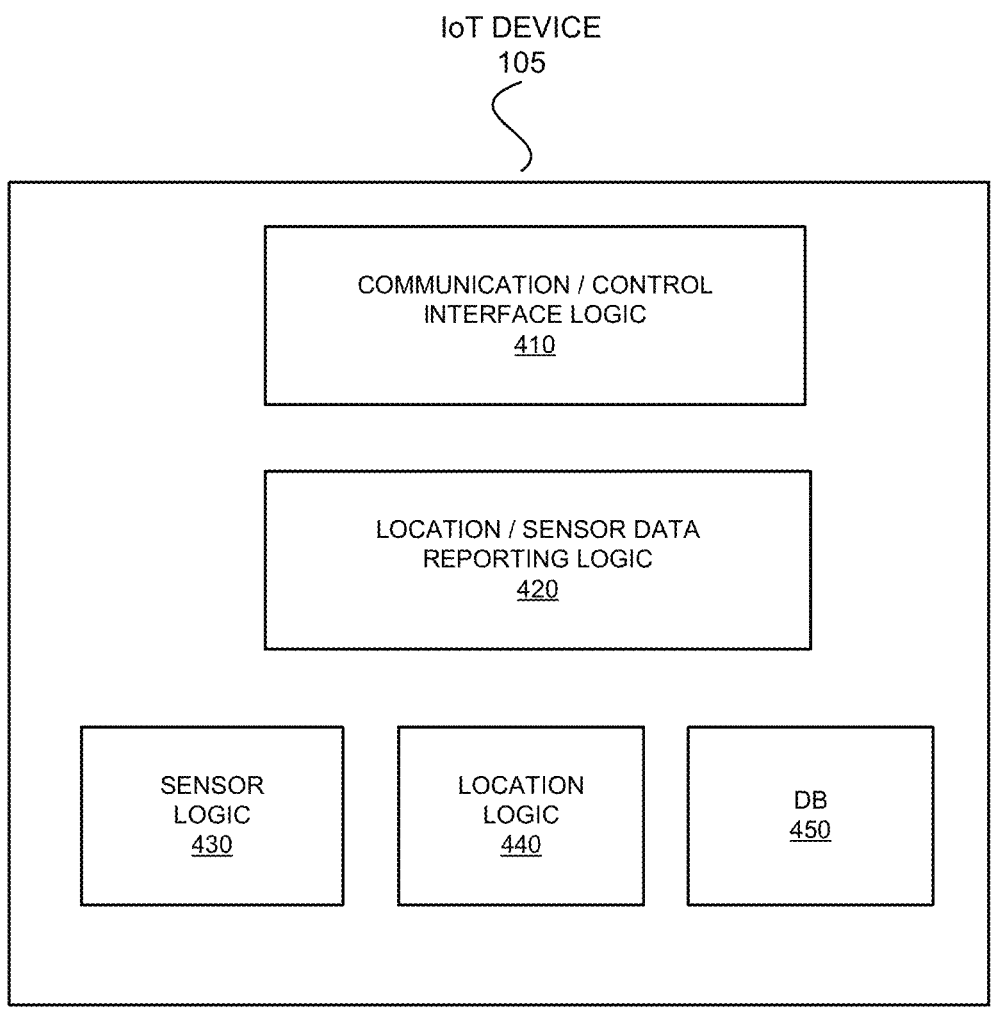
FIG. 4 is a diagram that illustrates exemplary functional components of an exemplary IoT device described herein.

FIG. 4 illustrates exemplary functional components of IoT device 105 that may include a reporting configuration that is configurable by connection management service 250. As shown, IoT device 105 may include communication/control interface logic 410, location/sensor data reporting logic 420, sensor logic 430, location logic 440, and a database (DB) 450. The functional components may be implemented based on the exemplary components previously described in relation to FIG. 3.

Communication/control interface logic 410 may receive messages from and/or send messages to IoT connection management engine 250 via base station 110. For example, communication/control interface logic 410 may generate a service request for transmission resources for initiating data transmission to mobile network 205. According to another example, communication/control interface logic 410 may receive command and control signals from IoT connection management engine 250, for example, for implementing device configuration operations according to the signals. According to another exemplary embodiment, communication/control interface logic includes a modem that operates according to the LTE-M standard.

Location/sensor data reporting logic 420 may generate data reporting messages using content, for example, retrieved from sensor logic 430, GPS logic 440, and/or DB 450, and forward the data reporting messages to communication/control interface logic 410 for transmission to mobile network 205. In one implementation, location/sensor data reporting logic 420 may determine the contents of the data reporting messages and configure a reporting schedule based on monitoring and/or reporting requirements associated with IoT device 105. In one embodiment, location/sensor data reporting logic 420 may re-configure a reporting schedule for IoT device 105 based on information received from communication/control interface logic 410. In other embodiments, location/sensor data reporting logic 420 may re-configure a monitoring schedule for IoT device 105 based on re-configuration of the reporting schedule.

Sensor logic 430 may monitor events and sensor information received from one or more sensors 115 associated with IoT device 105. Sensor logic 430 may also manage the operation of one or more sensors 115. For example, sensor logic 430 may direct one sensor 115 to provide one type of sensor data and direct another sensor 115 to provide another type of sensor data. Sensor logic 430 may identify which low power, short-range connectivity, such as wired, Bluetooth™, and/or BLE is to be used to connect to sensor 115. Sensor logic 430 may specify one or more types of sensor information to be collected by IoT device and/or sensors 115. Sensor logic 430 may initiate capture of sensor information according to a monitoring requirement associated with IoT device 105.

Location logic 440 may identify the location of IoT device 105 and/or one or more sensors 115 associated with IoT device 105. In one embodiment, location logic 440 may use global positioning system (GPS)/global navigation satellite system (GNSS) technology, and may determine location information, such as Cartesian coordinates (e.g., longitude, latitude, altitude, etc.), geographic information, and/or physical addresses associated with map information, obtained for IoT device 105. Location logic 440 may convert location information of one type into another type of information and forward the converted location information to location/sensor data logic 420. Location logic 440 may initiate capture of location information according to a monitoring requirement associated with IoT device 105.

DB 450 may store sensor information received from one or more sensors associated with IoT device 105. In one embodiment, the sensor information may include monitored conditions, such as location information, temperature readings, etc. In other embodiments, the sensor information may be stored with an associated date/time stamp that is recorded for each monitoring event. DB 406 may include information identifying IoT device 105 (e.g., International Mobile Equipment Identity (IMEI), etc.).

Figure 5:
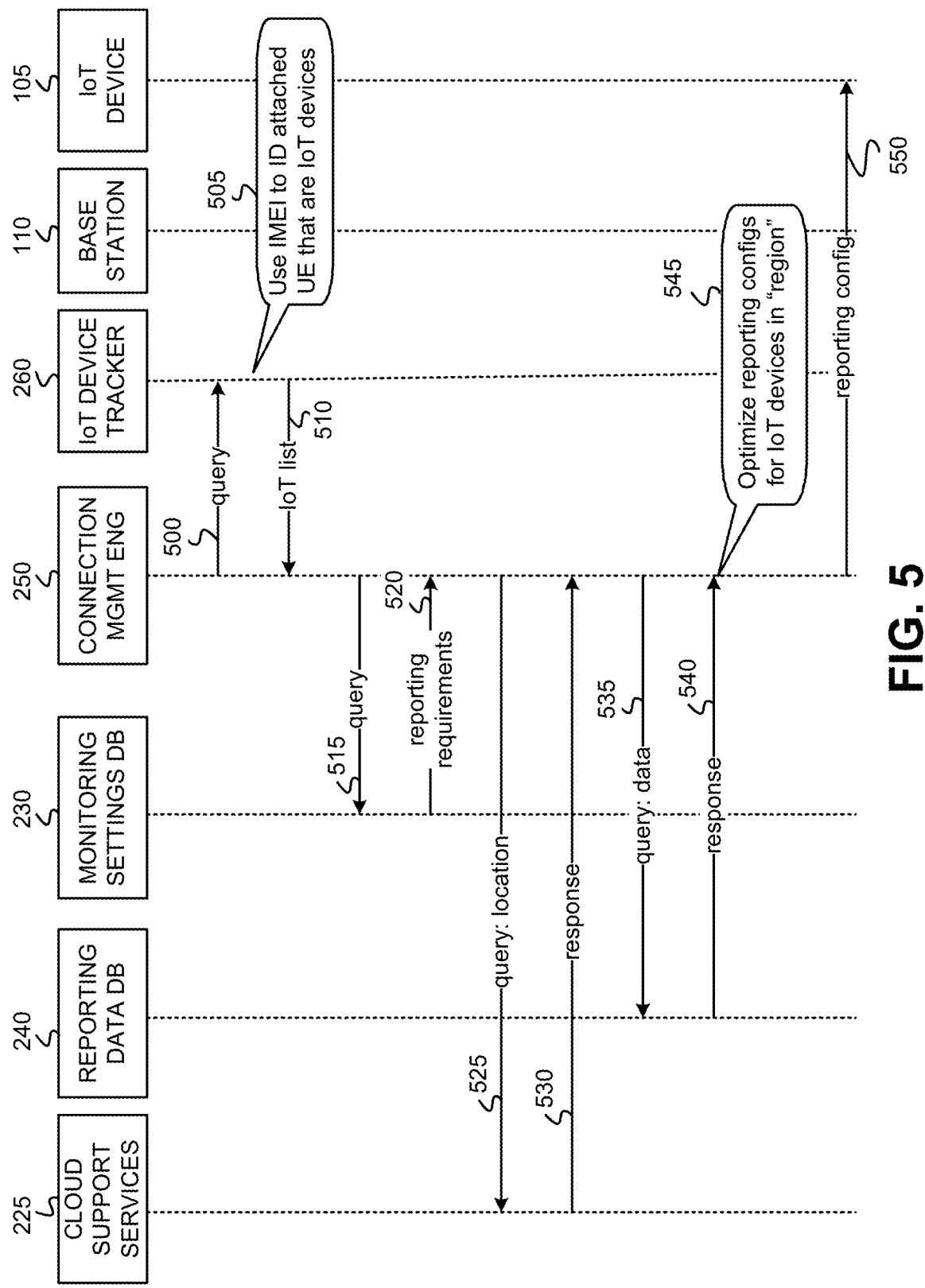
FIG. 5 is a diagram that illustrates exemplary messaging and operations associated with providing network access management for an IoT device within the context of the network architecture of FIG. 2.

FIG. 5 depicts exemplary messaging and operations associated with providing network access management for IoT devices 105 within the context of the network architecture of FIG. 2. As shown in FIG. 5, connection management engine 250 may send a query message 500 to IoT device tracking entity 260 requesting an identification of IoT devices 105 that are associated with base station 110. Upon receipt of message 500, IoT device tracking entity 260, using IMEI associated with attached IoT devices 105, generates an IoT list 505 identifying IoT devices 105. IoT device tracking entity 260 sends a response message 510 that includes the IoT list 505.

Upon receipt of message 510, IoT connection management engine 250 sends to monitoring settings DB 230 a query message 515 that identifies all or a portion of the IoT devices 105 included in IoT list 505 and requests monitoring and/or reporting requirements associated with each of the IoT devices 105. When monitoring settings DB 230 receives message 515, monitoring settings DB 230 retrieves the monitoring and/or reporting requirements associated with each of the IoT devices 105 and forwards the monitoring and/or reporting requirements to IoT connection management engine 250 via message 520. In one implementation, IoT connection management engine 250 determines sensor data acquisition frequency and/or parameters as well as data types defined by each of the monitoring and/or reporting requirements.

Once the data acquisition frequency and/or conditions are determined by IoT connection management engine 250, in one embodiment, IoT connection management engine 250 uses location information associated with IoT devices 105, for example, to determine that IoT devices 105 are located in a common area. In one embodiment, IoT connection management engine 250 may send a query message 525 that carries location information, such as GPS data associated with IoT devices 105, to cloud support services 225. In response, cloud support services 225 may provide a response 530 carrying location information in another format (e.g., physical addresses) corresponding to the GPS data.

In one embodiment, IoT connection management engine 250 may send a query message 535 to reporting data DB 240 requesting historical reporting data pertaining to one or more of the IoT devices 105. In response, reporting data DB 240 may send a response message 540 to IoT connection management engine 250 providing the select reporting data for the one or more of the IoT devices 105.

IoT connection management engine 250 may use monitoring and/or reporting requirements, location information, and/or historical reporting data of the IoT devices 105 to determine whether power consumption and/or network access requests may be reduced for one or more of the IoT devices, without compromising respective reporting requirements associated with the IoT devices 105. When IoT connection management engine 250 determines that altering a reporting schedule for one or more of the IoT devices 105 may reduce power consumption and/or network access requests for the one or more of the IoT devices 105, IoT connection management engine 250 may reconfigure 545 reporting configurations for the one or more of the IoT devices 105. In one embodiment, optimized reporting configuration for one of the IoT devices 105 (e.g., IoT device 105-1) may take into account a reporting configuration for at least one other IoT device 105 (e.g., IoT device 105-2). IoT connection management engine 250 may forward 550 the optimized reporting configuration (via base station 110) to the IoT devices 105 affected by the optimized reporting configuration.

Figure 6:
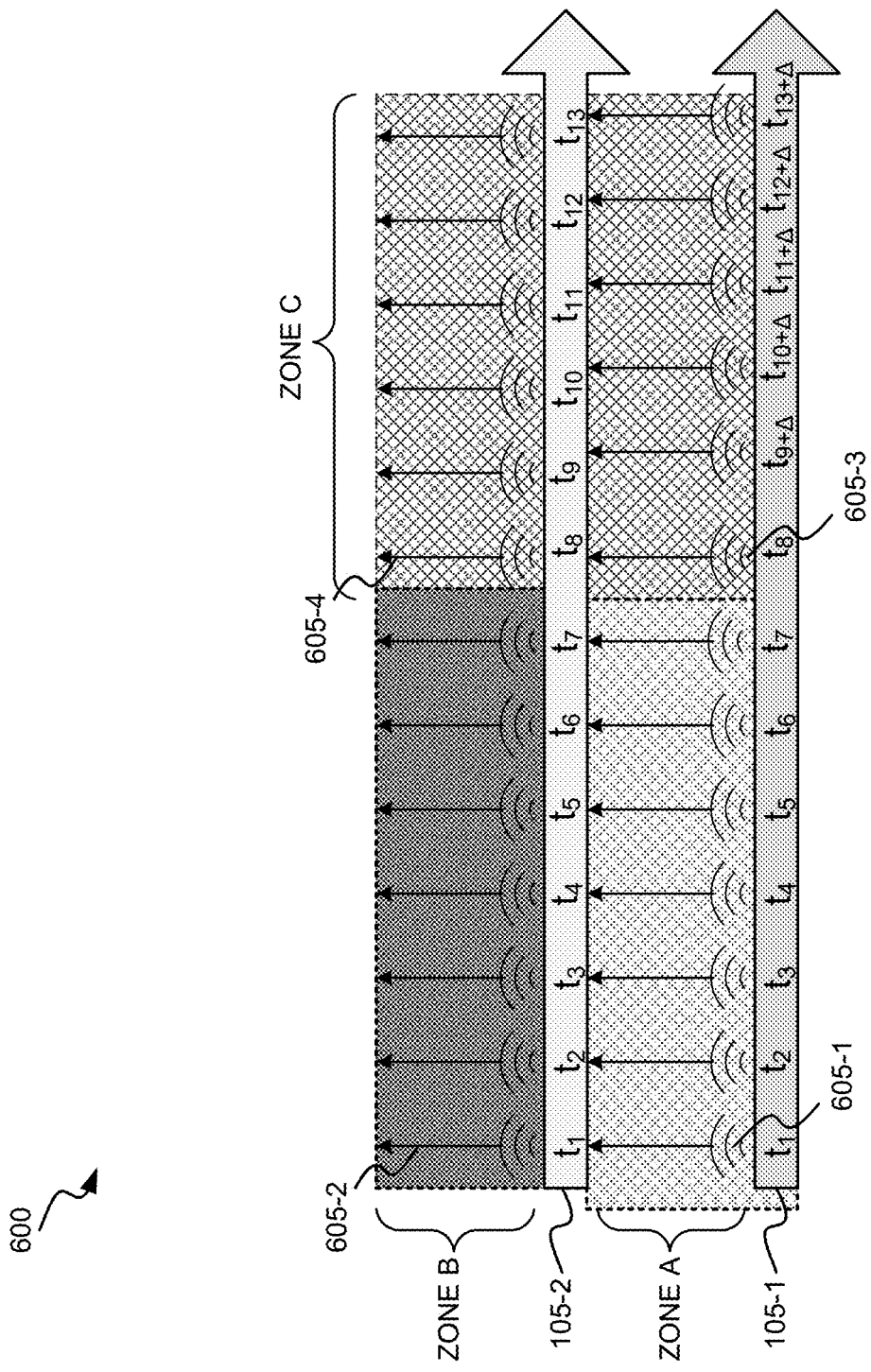
FIGS. 6 and 7 are diagrams that illustrate an exemplary implementation of a connection management process for multiple IoT devices.

FIG. 6 illustrates details of one exemplary implementation of a connection management process 600 for multiple IoT devices. In connection management process 600, a first IoT device 105-1 is located and activated in a first zone A (e.g., in a first shipping container). As shown, IoT device 105-1 is configured to monitor and periodically report data according to a reporting schedule that is determined based on a reporting requirement. The reporting data can be any kind of data, e.g., keep-alive signals, sensor information, etc. For example, at times $t_1$, $t_2$, $t_3$, $t_4$, $t_5$, $t_6$, and $t_7$, IoT device 105-1, initiates a service request message to a base station serving zone A, for transmission resources to transmit a data message. Upon receiving transmission resource assignment, IoT device 105-1 generates a reporting instance 605-1 as depicted by each radio symbol/arrow.

As also shown in connection management process 600, a second IoT device 105-2 is located and activated in a second zone B (e.g., in a second shipping container). As shown, IoT device 105-2 is configured to monitor and periodically report data according to a reporting schedule that is determined based on a reporting requirement. The reporting data can be any kind of data, and may be the same type as or a different type from that of IoT device 105-1. Also at times $t_1$, $t_2$, $t_3$, $t_4$, $t_5$, $t_6$, and $t_7$, IoT device 105-2, initiates a service request message to a base station serving zone B, for transmission resources to transmit a data message. In one embodiment, the base station serving zone A differs from the base station serving zone B. Upon receiving transmission resource assignment, IoT device 105-2 generates a reporting instance 605-2 as depicted by each radio symbol/arrow. IoT device 105-1 and IoT device 105-2 may both be registered with IoT connection management engine 250. In one embodiment, IoT device 105-2 may generate reporting instances at half of the frequency shown, for example, at times $t_1$, $t_3$, $t_5$, $t_7$, $t_9$, $t_{11}$, and $t_{13}$, etc.

At some point after time $t_7$, IoT device 105-1 may leave zone A and enter zone C (e.g., distribution center), which is served by a base station, and IoT device 105-2 may enter zone C from zone B. For example, IoT device 105-1 and IoT device 105-2 may be mobile devices attached to items in transit. In one embodiment, the base station serving zone C differs from the base stations serving zones A and B. In another embodiment, the base station serving zone C may be the same base station that serves zone A and/or zone B. The different zones may correspond to Cartesian coordinates, physical addresses, cell service areas, and/or any other designation of locality.

IoT connection management engine 250 may detect, after time is for example, that the reporting schedules for IoT device 105-1 and IoT device 105-2 coincide. In one embodiment, IoT connection management engine 250 may receive via the base station serving zone C a first data message associated with reporting instance 605-3 that includes location data corresponding to zone C. IoT connection management engine 250 may receive via the base station serving zone C a second data message associated with reporting instance 605-4 that includes location data corresponding to zone C. Using identification information (e.g., IMEI) and timestamp information included in the first and second data messages, IoT connection management engine 250 may perform look-ups in monitoring settings DB 230 and/or reporting data DB 240 to determine respective reporting schedules for IoT device 105-1 and IoT device 105-2.

In comparing the current reporting schedules for IoT device 105-1 and IoT device 105-2, IoT connection management engine 250 may identify an overlap in one or more scheduled reporting events. Based on the identified overlap, IoT connection management engine 250 may reconfigure, for example, the reporting configuration for IoT device 105-1 and/or IoT device 105-2. In one embodiment, IoT connection management engine 250 may determine an overlap of a threshold number of connectivity requests from a number of registered IoT devices 105 activated and deployed in zone C. In one embodiment, the threshold number is any number that is less than the total number of simultaneous signaling events that the LTE-M network is capable of carrying and/or that may be handled by the base station.

As shown in connection management process 600, IoT connection management engine 250 may send a message to IoT device 105-1 to apply an offset of time $\Delta$ to its current reporting frequency, at least while IoT device 105-1 and IoT device 105-2 are both located in zone C and maintain their current reporting frequencies. In one embodiment, $\Delta$ may be equal to some multiple of the eDRX paging cycle (e.g., $10.24s$) aligning to individual IoT device 105 PSM. In response to receiving the message via communication/control interface logic 410, location/sensor reporting logic 420 of IoT device 105-1 may then reconfigure its reporting schedule to apply the offset such that IoT device 105-1 initiates reporting events at times $t_{9+\Delta}$, $t_{10+\Delta}$, $t_{11+\Delta}$, $t_{12+\Delta}$, and $t_{13+\Delta}$ (instead of at $t_9$, $t_{10}$, $t_{11}$, $t_{12}$, and $t_{13}$). In one embodiment, the applied offset may at least reduce the potential number of "collisions" of connection requests sent from IoT device 105-1 and IoT device 105-2.

As a result of the new reporting configuration of IoT device 105-1, the transmission success rate for IoT device 105-1 and IoT device 105-2 may increase due to a reduction in the number of occurrences that either may be required to wait for transmission resource assignment due to signal overloading associated with connectivity requests for the base station serving zone C. A higher transmission success rate decreases power consumption by IoT device 105-1 and/or IoT device 105-2. For purposes of discussion, FIG. 6 shows only two conflicting reporting instances associated with IoT device 105-1 and IoT device 105-2, but any number of IoT devices 105 may be involved (i.e., reconfigured) and/or any number of conflicting reporting instances may be forecasted or addressed.

Figure 7:
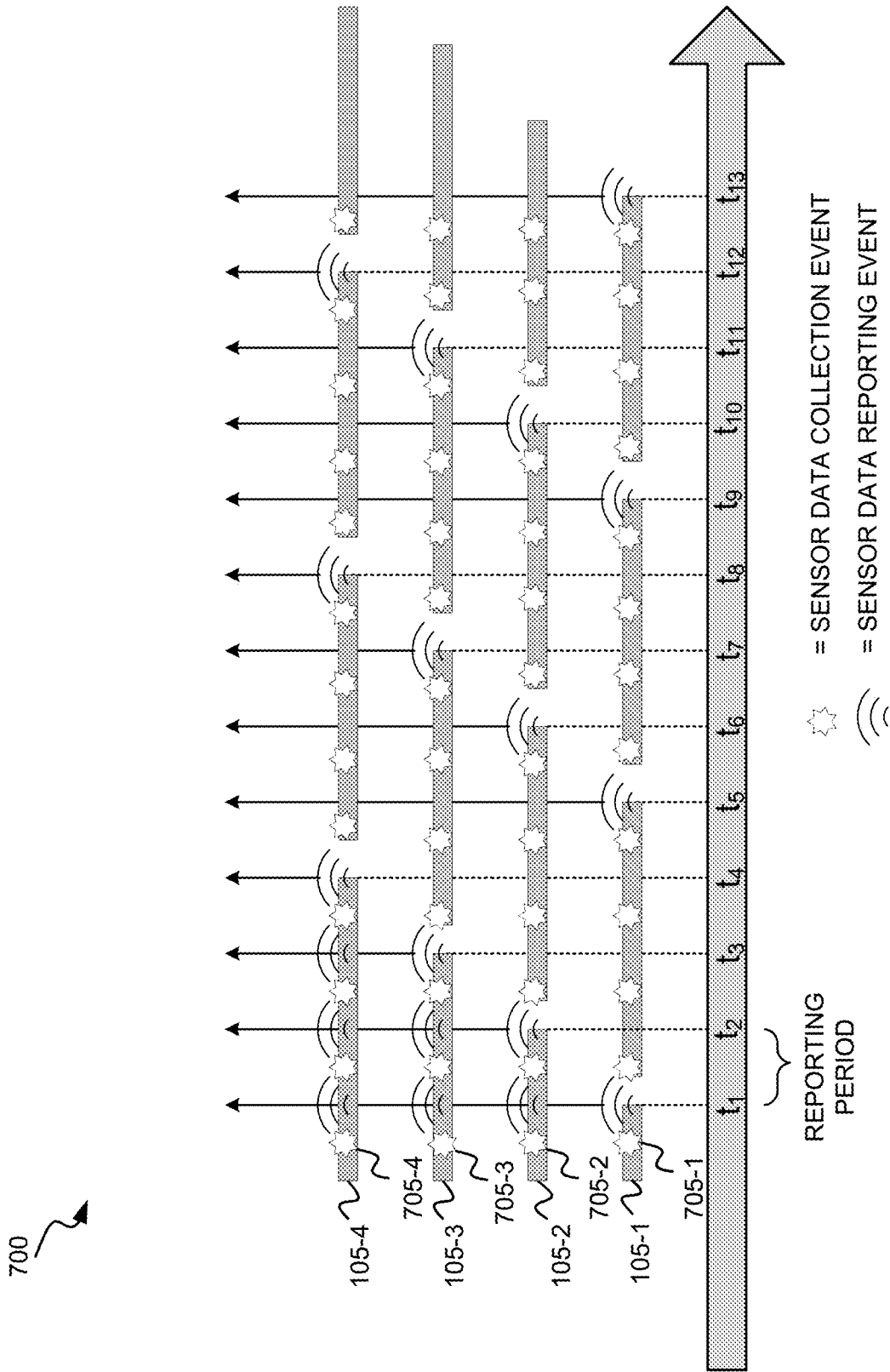

FIG. 7 illustrates details of one exemplary implementation of a connection management process 700 for multiple (mobile or stationary) IoT devices 105-1, 105-2, 105-3, and 105-4 located and activated in a region (e.g., cell) served by a same base station. For example, the IoT devices 105-1, 105-2, 105-3, and 105-4 may be associated with cargo in a shipping container. According to connection management process 700, IoT connection management engine 250 may detect from the contents of the data messages received at time $t_1$, for example, that IoT devices 105-1, 105-2, 105-3, and 105-4 are initially configured to perform sensor data collection (705-1, 705-2, 705-3, 705-4) at a same frequency (e.g., every 5 mins) and report the same type of sensor data (e.g., temperature readings) after each data collection event (represented by a starburst). In one embodiment, IoT connection management engine 250 may use information retrieved from monitoring settings DB 230 and/or reporting data DB 240 to determine that IoT devices 105-1, 105-2, 105-3, and 105-4 are initially configured to perform sensor data collection (705-1, 705-2, 705-3, 705-4) at a same frequency and/or report the same type of sensor data after each data collection event.

IoT connection management engine 250 may perform an analysis (e.g., using an algorithm) to determine an optimal reporting schedule for IoT devices 105-1, 105-2, 105-3, and 105-4 based on the identified monitoring and/or reporting frequencies for IoT devices 105-1, 105-2, 105-3, and 105-4 and/or historical reporting data retrieved from reporting DB 240. In one embodiment, IoT connection management engine 250 optimizes reporting of a similar type of data (e.g., temperature measurements) by implementing representative reporting for the group of IoT devices 105-1, 105-2, 105-3, and 105-4 for collected sensor data beginning at time $t_5$ (i.e., without change to the data acquisition schedule for each IoT device 105). IoT connection management engine 250 may send messages to IoT devices 105-1, 105-2, 105-3, and 105-4 such that only IoT device 105-1 reports sensor data (acquired at four sensor data collection events) at times $t_5$, $t_9$, $t_{13}$, etc.; only IoT device 105-2 reports sensor data (acquired at four sensor data collection events) at times $t_6$, $t_{10}$, etc.; only IoT device 105-3 reports sensor data (acquired at four sensor data collection events) at time times $t_7$, $t_{11}$, etc.; and only IoT device 105-4 reports sensor data (acquired at four sensor data collection events) at times $t_8$, $t_{12}$, etc.

As a result of the new reporting configurations of IoT devices 105-1, 105-2, 105-3, and 105-4, connectivity requests to base station 110 serving the group of IoT devices 105-1, 105-2, 105-3, and 105-4 may be reduced, for example, by about 75%. Individually, IoT devices 105-1, 105-2, 105-3, and 105-4 may conserve power by transmitting the reduced number of reporting events by extending, for example, the amount of time in eDRX or PSM modes. For example, IoT devices 105-1, 105-2, 105-3, and 105-4 may be placed in sleep mode (e.g., eDRX cycle reporting) between data collection events, and placed in PSM between data reporting events. FIG. 7 shows a grouping of four IoT devices, but any number of IoT devices may be grouped.

Figure 8:
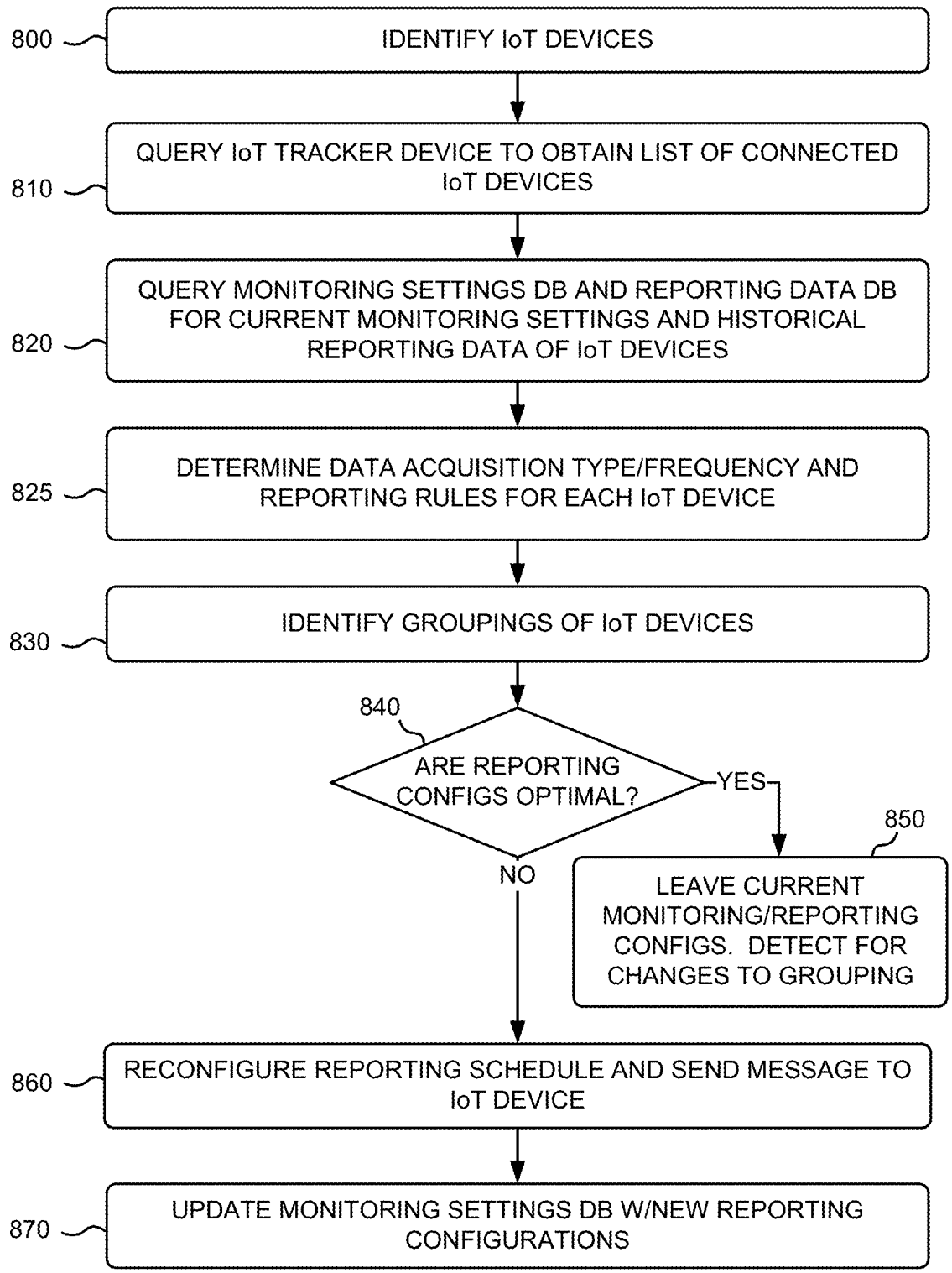
FIG. 8 is a flow diagram that illustrates an exemplary process for managing network connection configurations associated with multiple IoT devices.

FIG. 8 is a flow diagram that illustrates an exemplary process for managing LTE-M network connectivity of IoT devices 105. The exemplary process of FIG. 8 may be implemented by IoT connection management engine 250.

The exemplary process includes IoT connection management engine 250 identifying IoT devices 105 located in a particular area (e.g., a cell, a transport vehicle, a building, a floor of a multi-story building, an area of a floor in a building, etc.) (block 800). IoT connection management engine 250 queries IoT device tracking entity 260 to obtain a list of connected IoT devices that have been identified by base station 110 by an identifier, such as an IMEI, to be IoT devices 105 (block 810). In other implementations, IoT connection management engine 250 queries base station 110 to obtain a list of connected UE, and IoT connection management engine 250 identifies IoT devices 105 from the list, using an identifier such as an IMEI of the connected devices. The list of devices may identify a device name of each connected IoT device 105, a location of each connected IoT device 105, and/or associations with other connected IoT devices 105 in an identified area served by base station 110.

IoT connection management engine 250 queries monitoring settings DB 230 and reporting data DB 240 for the current monitoring settings and historical reporting data for each of the IoT devices 105 (block 820). IoT connection management engine 250 may index each IoT device 105 in monitoring settings DB 230 and reporting data DB 240 using the associated IMEI and/or any other identifier, to retrieve the stored data for each of the IoT devices 105. The monitoring settings information may identify the type of IoT device 105, type of sensor information, monitoring frequency, location parameters, etc. The historical reporting data may include values associated with sensor readings, time/day stamps for sensor readings and/or reporting messages, location information associated with the sensor readings, etc.

IoT connection management engine 250 may use the retrieved data to determine the types of data being monitored, the data acquisition frequencies, and/or reporting schedules for which each of the IoT devices 105 are currently configured (block 825). IoT connection management engine 250 may analyze the monitoring and/or reporting configurations for one or more of the IoT devices 105 to form device "groupings" consisting of neighboring IoT devices 105 in a localized area (block 830). In addition to location, groupings may be based on device type, a common subscriber, sensor data type, data acquisition frequency, reporting periodicity, and/or any other parameter associated with the IoT devices 105.

IoT connection management engine 250 determines whether current reporting configurations of each of the IoT devices 105 in a grouping are optimized (block 840). IoT connection management engine 250 may base the determination of optimization on reduced power usage and/or access network signaling associated with the current reporting schedules for the individual IoT devices 105 in the grouping. Collectively, power savings and/or connectivity request reduction may be realized, for example, based on the proximity of IoT devices 105 in a specified area (e.g., shipping container, warehouse, distribution center, etc.).

In one exemplary embodiment, IoT connection management engine 250 filters current IoT data reporting configuration information associated with IoT devices 105 in a configured region, to strategically optimize connectivity network usage and IoT device power saving. For example, IoT connection management engine 250 may determine that one or more devices 105 currently report acquired data periodically while not under a requirement for periodic reporting. As another example, IoT connection management engine 250 may determine that two or more devices 105 currently report acquired data at times that coincide. The number of IoT devices 105 that send reports at the same time may be in the hundreds, for example, in an asset tracking usage in or around a shipping yard, distribution center, etc. In one embodiment, IoT connection management engine 250 may determine that a threshold number of devices 105 currently report acquired data at times that coincide. The threshold number may correspond to connectivity capacity of base station 110. In another embodiment, IoT connection management engine 250 may determine that a number of IoT devices 105 are required to report data of a same type (e.g., temperature) in a localized proximity (e.g., shipping container), i.e., redundant reporting requirements. In one embodiment, IoT connection management engine 250 may determine that current reporting are not optimal based on analysis that identifies ones or more potential benefits to coordinated data reporting among associated IoT devices 105.

If a current reporting configuration is optimized for one or more of the IoT devices 105 in the grouping, then IoT connection management engine 250 does not change the current reporting configuration for that IoT device 105, and may continue to monitor for any changes to the grouping, for example, based on re-location, deactivation, etc., of one or more of the IoT devices 105 (NO—block 850). Alternatively, if a reporting configuration is not optimized for one or more of the IoT devices in the grouping, IoT connection management engine 250 may reconfigure reporting settings, and send a message to the one or more IoT devices 105 (block 860). IoT connection management engine 250 may update monitoring settings DB 230 with the new reporting settings for the one or more IoT devices 105 (block 860).

The blocks of FIG. 8 may be selectively repeated for each new IoT device 105 discovered by IoT connection management engine 250.

IoT devices 105 receive their own messages containing the modified reporting configurations from IoT connection management engine 250 via base station 110. IoT devices 105 read the messages and implement the new reporting configurations (e.g., program location/sensor data reporting logic 420), without comprising applicable reporting requirements for each of the IoT devices 105. In one embodiment, when a determination is made that an IoT device 105 does not have a periodic reporting requirement (e.g., keep-alive), for example, the new reporting configuration may direct IoT device 105 to skip periodic reporting, and instead send data reports as "alarms" when a sensor data reading exceeds a threshold value, to thereby reduce connectivity requests to base station 110. For example, when a temperature reading exceeds a particular value, connectivity resources are requested and assigned. Between reports, IoT device 105 may be maintained in PSM to save energy. Skipped reports correspond to sensor readings that are within an acceptable range of values. As another example, an "alarm" may be triggered when IoT device 105 crosses (e.g., exits) a geofence associated with a location of IoT device 105.

In another exemplary embodiment, the new reporting configuration may direct IoT device 105 to skip periodic reporting, and instead send data reports only when a value associated with a sensor reading changes from a previous reported value, to thereby reduce connectivity requests to base station 110. For example, when a temperature reading changes from a previously-reported value connectivity resources are requested and assigned. Between reports, IoT device 105 may be maintained in PSM to save energy. Skipped reports are correspond to sensor reading values that are the same as the previously-reported values (i.e., no change).

In yet another exemplary embodiment, the new reporting configuration may direct IoT device 105 to change a periodicity of periodic reporting based on implementation of longer sleep modes (i.e., eDRX). In one embodiment, referring again to FIG. 6, the new reporting configuration may direct IoT device 105 to apply an offset to its periodic reporting to avoid queuing of transmission request from IoT device 105. In another embodiment, referring again to FIG. 7, the new reporting configuration may direct IoT device 105 to replace periodic reporting (while maintaining data acquisition) with alternating representative reporting.

In one exemplary embodiment, IoT device 105 may be used as a "tracker" device associated with an item for transport. IoT device 105 may be equipped with an accelerometer, pressure measurement capability, and/or altitude capability. IoT device 105 may be configured with automatic airplane mode activation/deactivation. In this mode, IoT device 105 may use acceleration information to determine that IoT device may be located on a plane, for example, when the plane accelerates at a rate that exceeds a threshold value. Based on this determination, IoT device 105 may use pressure sensor information to determine an altitude associated with its location. Using the acceleration information and the pressure/altitude information, IoT device 105 may automatically activate the airplane mode.

Once in airplane mode, IoT device 105 may suspend all data reporting. For example, IoT device 105 may power off the front-end cellular radio frequency (RF) processing chain and suspend cellular baseband processing for additional power saving. Data acquired by IoT device 105 may be stored in a buffer while in the airplane mode. IoT device 105 may automatically deactivate airplane mode upon a determination that the plane has landed, for example, based on deceleration information and pressure information indicating the plane's descent or current speed indicating that the plane is immobile on the ground. IoT device 105 may re-register with the cellular network and may transmit reporting data via an LTE-M network.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIG. 8, and message flows with respect to FIG. 5, the order of the blocks and/or message flows may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
    determining, by a network device, a reporting configuration for respective Internet of Things (IoT) devices, wherein the reporting configuration configures an initiation of reporting instances for reporting data via a radio access network, and wherein each of the IoT devices acquires the data according to an associated data acquisition frequency;
    determining, by the network device and based on the reporting configurations, that the initiation of at least one of the reporting instances for at least one IoT device coincides with the initiation of the reporting instances for at least a threshold number of the IoT devices, wherein the threshold number is determined based on a load capacity of the radio access network; and
    modifying, by the network device, the reporting configuration of each IoT device to include alternating representative reporting, which reduces a current frequency of the initiation of the reporting instances for each IoT device, and wherein each IoT device maintains the associated data acquisition frequency.

2. The method of claim 1, wherein the alternating representative reporting includes applying a starting time offset to the at least one reporting instance.

3. The method of claim 1, wherein the modified reporting configuration configures the at least one IoT device to automatically switch the at least one IoT device to an airplane mode based on acceleration data and pressure data associated with the at least one IoT device.

4. The method of claim 1, further comprising:
    determining the reporting configuration based on a deployment of each IoT device within an IoT service area.

5. The method of claim 1, wherein the alternating representative reporting enables at least one of a potential signal loading reduction over the radio access network or a potential power consumption reduction for the at least one IoT device.

6. The method of claim 1, wherein the alternating representative reporting limits the initiation of the reporting instances, by the at least one IoT device, to an alarm event triggered by the reporting data.

7. The method of claim 1, wherein the reporting data is obtained for multiple data collection events within a single reporting period of the alternating representative reporting instances.

8. A network device comprising:
    a processor configured to:
        determine a reporting configuration, for respective Internet of Things (IoT) devices, wherein the reporting configuration configures an initiation of reporting instances for reporting data via a radio access network, and wherein each of the IoT devices acquires the data according to an associated data acquisition frequency;
        determine, based on the reporting configurations, that the initiation of at least one of the reporting instances for at least one IoT device coincides with the initiation of the reporting instances for at least a threshold number of the IoT devices, wherein the threshold number is determined based on a load capacity of the radio access network; and
        modify the reporting configuration of each IoT device to include alternating representative reporting, which reduces a current frequency of the initiation of the reporting instances for each IoT device, and wherein each IoT device maintains the associated data acquisition frequency.

9. The network device of claim 8, wherein the alternating representative reporting applies a starting time offset to the at least one reporting instance.

10. The network device of claim 8, wherein the modified reporting configuration configures the at least one IoT device to automatically switch the at least one IoT device to an airplane mode based on acceleration data and pressure data associated with the at least one IoT device.

11. The network device of claim 8, wherein the processor is further configured to:
determine the reporting configuration based on a deployment of each IoT device within an IoT service area.

12. The network device of claim 8, wherein the alternating representative reporting enables at least one of a potential signal loading reduction over the radio access network or a potential power consumption reduction for the at least one IoT device.

13. The network device of claim 8, wherein the alternating representative reporting limits the initiation of the reporting instances, by the at least one IoT device, to an alarm event triggered by the reporting data.

14. The network device of claim 8, wherein the reporting data is obtained for multiple data collection events within a single reporting period of the alternating representative reporting instances.

15. A non-transitory, computer-readable storage medium storing instructions executable by a processor of a computational device, which when executed cause the computational device to:
determine a reporting configuration, for respective Internet of Things (IoT) devices, wherein the reporting configuration configures an initiation of reporting instances for reporting data via a radio access network, and wherein each of the IoT devices acquires the data according to an associated data acquisition frequency;
determine, based on the reporting configurations, that the initiation of at least one of the reporting instances for at least one IoT device coincides with the initiation of the reporting instances for at least a threshold number of the IoT devices, wherein the threshold number is determined based on a load capacity of the radio access network; and
modify the reporting configuration of each IoT device to include alternating representative reporting, which reduces a current frequency of the initiation of the reporting instances for each IoT device, and wherein each IoT device maintains the associated data acquisition frequency.

16. The non-transitory, computer-readable storage medium of claim 15, wherein the alternating representative reporting applies a starting time offset to the at least one reporting instance.

17. The non-transitory, computer-readable storage medium of claim 15, wherein the modified reporting configuration configures the at least one IoT device to automatically switch the at least one IoT device to an airplane mode based on acceleration data and pressure data associated with the at least one IoT device.

18. The non-transitory, computer-readable storage medium of claim 15, wherein the instructions further cause the computational device to:
determine the reporting configuration based on a deployment of each IoT device within an IoT service area.

19. The non-transitory, computer-readable storage medium of claim 15, wherein the alternating representative reporting enables at least one of a potential signal loading reduction over the radio access network or a potential power consumption reduction for the at least one IoT device.

20. The non-transitory, computer-readable storage medium of claim 15, wherein the alternating representative reporting limits the initiation of the reporting instances, by the at least one IoT device, to an alarm event triggered by the reporting data.

* * * * *